Dec. 6, 1960  F. D. RICHARDSON  2,963,314
VEHICLE TRUNK
Filed Oct. 8, 1958
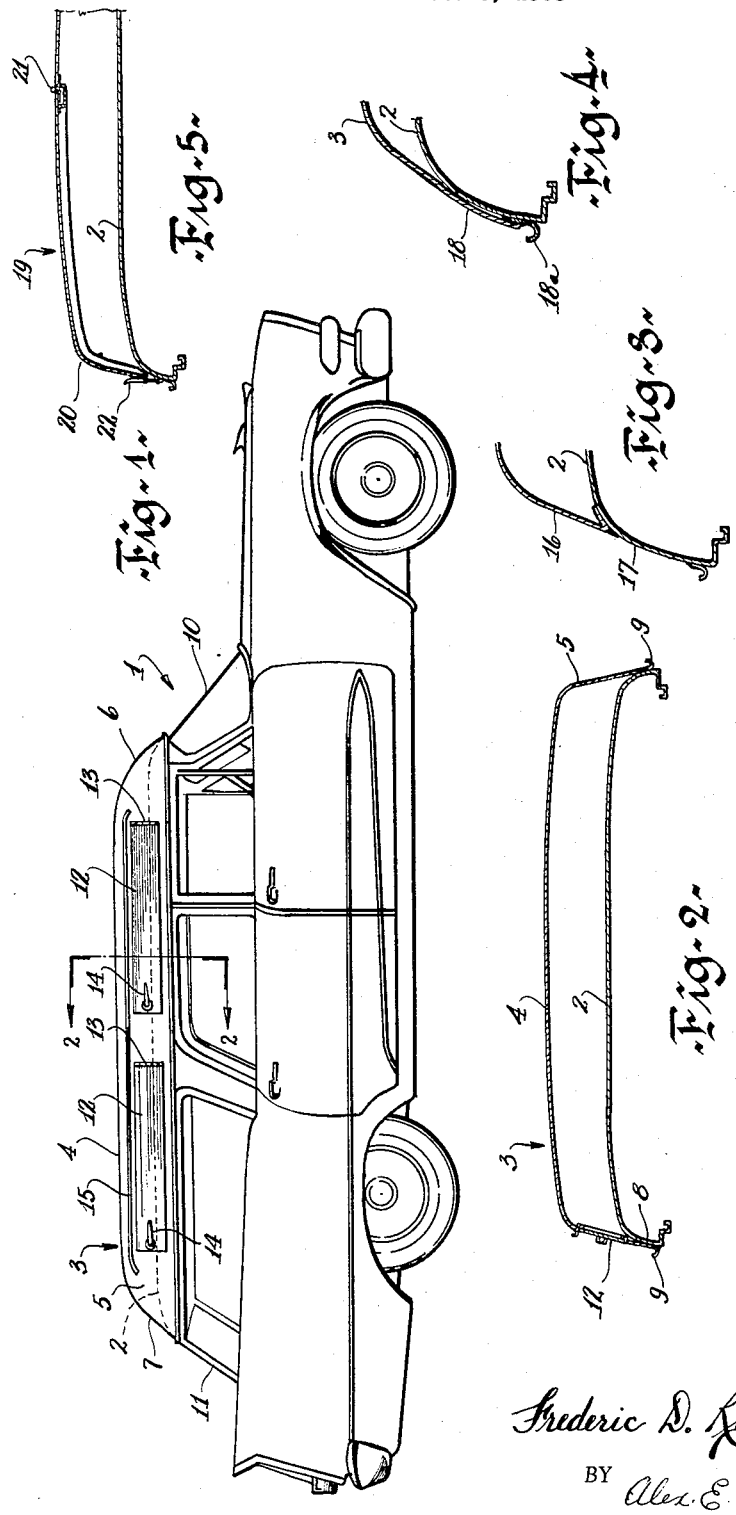
INVENTOR
Frederic D. Richardson
BY Alex E. Machae
ATTORNEY United States Patent Office 2,963,314
Patented Dec. 6, 1960

2,963,314

VEHICLE TRUNK

Frederic D. Richardson, 34 Broadway Ave.,
Ottawa, Ontario, Canada

Filed Oct. 8, 1958, Ser. No. 766,037

2 Claims. (Cl. 296—37)

This invention relates to vehicle trunks.

It has frequently been proposed to utilize the roof section of motor cars for the transportation of luggage and other articles. Usually, accessory rack means are provided for the purpose of securing in place the transported articles. The provision of built-in article receiving compartments in the roof section of a motor car has also been proposed, such compartments being accessible from the interior of the motor car and thus of expensive and awkward construction.

It is an object of this invention to provide a storage compartment or trunk surmounting the closed conventional roof of a motor vehicle and rigidly secured in fixed relation thereto whereby the mounting of said trunk on said vehicle may be effected without affecting the conventional body structure of said vehicle.

The invention contemplates the provision, in a motor vehicle having a closed roof, of a trunk having a top wall and side walls fixed to said roof, at least one of said side walls having a door therein.

The invention will be described with reference to the accompanying drawing, in which Figure 1 is a side elevation of a motor vehicle having incorporated therein a trunk in accordance with the invention, Figure 2 is a cross-sectional view of the trunk on line 2—2 of Figure 1, Figure 3 is a partial cross-sectional elevation of a trunk illustrating a modified mounting means therefor, Figure 4 is a partial cross-sectional elevation of a trunk illustrating another modified form of mounting means therefor, and Figure 5 is a partial cross-sectional elevation of a modified form of trunk.

Referring to Figures 1 and 2, 1 is a motor car of conventional form and having a closed roof 2 of normal construction.

Surmounting the roof 2 is a trunk 3, preferably of moulded, pressed or stamped one-piece metal construction. Thus, the trunk may be formed from a sheet of metal, such as steel aluminum or the like or plastic compositions glass fibers, and the like. The trunk has a top wall 4, side walls 5, front wall 6, and rear wall 7. The edge portions of the walls are fixed, as by welding or the like, to the marginal portions 8 of the vehicle roof 2. Preferably, the edge portions of the walls terminate in gutters 9, and such gutters 9 may replace the normal gutters usually provided in a car roof.

Preferably, the forward and rearward walls 6 and 7 are inclined to follow the normal contour of the vehicle body whereby the trunk has a streamlined contour to avoid undue air resistance. Thus, the front wall 6 is inclined in generally the same direction as the windshield 10 of the vehicle, and the rear wall 7 is inclined in generally the same direction as the rear wall or window 11 of the motor car.

One or two doors 12 are provided in at least one side wall 5 of the trunk and preferably in the side wall on the curb or right side of the vehicle for convenient access. Each door 12 is of elongated form and is hinged at 13 to the side wall. Each door has a handle 14 with conventional catch (not shown). Preferably, the hinged end of the door is adjacent the front of the vehicle to exert a closing force on the door during forward movement of the vehicle.

Preferably, a gutter 15 is provided above the doors.

Referring to Figure 3, the edge portion 16, of the side walls 5 of the trunk is shown as welded to the vehicle roof whereby the wall 5 merges into the downward sloping marginal portion 17 of the vehicle roof.

Referring to Figure 4, an edge portion 18 of the side walls of the trunk is shown as welded to the gutter 18a of the vehicle roof rather than to the roof proper. This may be desirable in some instances because of the added rigidity of the gutter as compared with the roof member.

Figure 5 illustrates a trunk 19 mounted on the vehicle roof and having a door 20 which constitutes one side wall and approximately half of the top wall of the trunk. The door 20 is hinged at 21 along approximately the longitudinal center line of the trunk and has a handle 22 which is preferably located on the curb side of the vehicle. Such a door provides ready access to the trunk interior.

It will be understood that a trunk as described may be mounted on a vehicle roof during the construction thereof or to existing vehicles. In each case, the trunk is adapted to be mounted on the closed roof of a motor vehicle with the edges of the trunk in fixed and sealed relation to the roof whereby the trunk is completely enclosed and, therefore, fully protected as to contents from the elements.

The trunk is preferably relatively low in height whereby it does not mar the appearance of the vehicle and offers little wind resistance. It will be apparent that a trunk as described of from six to twelve inches in height will provide a substantial amount of fully protected storage space.

I claim:

1. In combination with a motor vehicle having an inclined windshield and rear window and a closed integral curved roof member having a curvature extending upwardly and laterally between the windshield and rear window to form side and top portions, a storage construction comprising, an integral curved enclosure completely enclosing the roof member therebeneath without any exposed roof areas and having front, rear and side walls having lower edges bonded to and extending upwardly from a lower mounting rim of said roof member in tangential relation to the curvature of the roof member, said front and rear walls being disposed at substantially the same inclination as the windshield and rear window respectively terminating in a top wall in spaced parallel relation to the top portion of the roof member, said side walls having door means therein to provide access to the storage space between the roof portions and walls of the storage construction.

2. The construction of claim 1, including rain gutters connected to the lower edges of the front, rear and side walls.

References Cited in the file of this patent

UNITED STATES PATENTS

| | | |
|---|---|---|
| 1,762,640 | Sanford | June 10, 1930 |
| 1,804,868 | Gage | May 12, 1931 |
| 2,597,656 | Martin | May 20, 1952 |

FOREIGN PATENTS

| | | |
|---|---|---|
| 679,698 | France | Jan. 13, 1930 |